(12) United States Patent
Fujii et al.

(10) Patent No.: US 7,666,238 B2
(45) Date of Patent: Feb. 23, 2010

(54) POLISHING COMPOSITION

(75) Inventors: Shigeo Fujii, Wakayama (JP); Hiroyuki Yoshida, Wakayama (JP); Toshiya Hagihara, Wakayama (JP); Hiroaki Kitayama, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 11/948,705

(22) Filed: Nov. 30, 2007

(65) Prior Publication Data

US 2008/0160881 A1 Jul. 3, 2008

Related U.S. Application Data

(62) Division of application No. 10/175,884, filed on Jun. 21, 2002, now abandoned.

(30) Foreign Application Priority Data

| Jun. 21, 2001 | (JP) | ............................... 2001-188722 |
| Jul. 26, 2001 | (JP) | ............................... 2001-226322 |
| Nov. 12, 2001 | (JP) | ............................... 2001-346468 |

(51) Int. Cl.
  *B24D 3/02* (2006.01)
  *C09C 1/68* (2006.01)
  *C09G 1/02* (2006.01)
  *C09K 13/00* (2006.01)

(52) U.S. Cl. .............................. 51/307; 51/308; 51/309; 106/3; 252/79.1; 216/89; 216/96; 216/100

(58) Field of Classification Search ........... 51/307–309; 438/692, 693; 106/3; 252/79.1; 216/89, 216/96, 100

See application file for complete search history.

(56) References Cited

U.S. PATENT DOCUMENTS 4,956,015 A * 9/1990 Okajima et al. ................ 106/3

(Continued)

FOREIGN PATENT DOCUMENTS

CN 1253963 A 5/2000

(Continued)

OTHER PUBLICATIONS

Office Action issued in Japanese Application No. 2001-226322 (dated Jul. 3, 2009) (Without Translation).

*Primary Examiner*—Jerry Lorengo
*Assistant Examiner*—Pegah Parvini
(74) *Attorney, Agent, or Firm*—Birch, Stewart, Kolasch & Birch, LLP

(57) ABSTRACT

A polishing composition comprising an abrasive and water, wherein the polishing composition has an index of degree of sedimentation of 80 or more and 100 or less; a process for producing a substrate comprising polishing a substrate to be polished using the above-mentioned composition; a process for preventing clogging of a polishing pad comprising applying the above-mentioned composition; a process for preventing clogging of a polishing pad comprising applying the above-mentioned composition to polishing with a polishing pad for a nickel-containing object to be polished; and a process for preventing clogging of a polishing pad comprising applying a composition comprising a hydrophilic polymer having two or more hydrophilic groups in its molecule and a molecular weight of 300 or more, or a compound capable of dissolving nickel hydroxide at a pH of 8.0, and water to polishing with a polishing pad for a nickel-containing object to be polished.

9 Claims, 2 Drawing Sheets

500 μm

U.S. PATENT DOCUMENTS

| | | |
|---|---|---|
| 5,226,955 A | 7/1993 | Owaki |
| 6,224,464 B1 | 5/2001 | Nojo et al. |
| 6,375,545 B1 | 4/2002 | Yano et al. |
| 6,440,856 B1 | 8/2002 | Bessho et al. |
| 6,569,216 B1 | 5/2003 | Taira et al. |
| 6,783,434 B1 * | 8/2004 | Akahori et al. ............... 451/41 |
| 2001/0003672 A1 | 6/2001 | Inoue et al. |
| 2001/0006225 A1 | 7/2001 | Tsuchiya et al. |
| 2001/0051746 A1 | 12/2001 | Hagihara et al. |
| 2002/0037642 A1 | 3/2002 | Wake et al. |
| 2002/0129559 A1 * | 9/2002 | Ito et al. ....................... 51/307 |
| 2003/0006396 A1 * | 1/2003 | Wang et al. ................. 252/79.1 |

FOREIGN PATENT DOCUMENTS

| | | |
|---|---|---|
| EP | 1020501 A2 | 7/2000 |
| JP | 07-070553 | 3/1995 |
| JP | 7-216345 | 8/1995 |
| JP | 9-137156 A | 5/1997 |
| JP | 9-143455 A | 6/1997 |
| JP | 11-293231 | 10/1999 |
| JP | 11-349926 | 12/1999 |
| JP | 2000-63805 A | 2/2000 |
| JP | 2000-160141 A | 6/2000 |
| JP | 2001-064631 A | 3/2001 |
| JP | 2001-064632 A | 3/2001 |
| JP | 2001-064681 A | 3/2001 |
| JP | 2001-064685 A | 3/2001 |
| JP | 2001-064688 A | 3/2001 |
| JP | 2001-085372 | 3/2001 |
| JP | 2001-89746 A | 4/2001 |
| JP | 2001-107089 A | 4/2001 |
| JP | 2001-155332 A | 6/2001 |
| JP | 2001-187879 | 7/2001 |
| WO | WO-00/32712 | 6/2000 |

* cited by examiner

POLISHING COMPOSITION

CROSS-REFERENCE TO RELATED APPLICATIONS

The present application is a 37 C.F.R. § 1.53(b) divisional of U.S. application Ser. No. 10/175,884 filed Jun. 21, 2002, now abandoned, which in turn claims priority on Japanese Application No. 2001-188722 filed Jun. 21, 2001; Japanese Application No. 2001-226322 filed Jul. 26, 2001; and Japanese Application No. 2001-346468 filed Nov. 12, 2001. The entire contents of each of these applications are hereby incorporated by reference.

BACKGROUND OF THE INVENTION

1. Field of the Invention

The present invention relates to a polishing composition, a process for producing a substrate comprising applying the polishing composition and a process for preventing clogging of a polishing pad.

2. Discussion of the Related Art

Hard disks have been greatly developed over the years in the trends of miniaturization and high capacity, so that the trend of high density has been progressed. Consequently, the minimum recording area has become smaller, and the floating amount of a magnetic head has been made increasingly smaller. Therefore, there have been desired to reduce the surface roughness and the fine waviness, and to reduce surface defects such as scratches and pits in a hard disk substrate. With this trend of development, a harder polishing pad having a smaller pore size has been used in a step of polishing the substrate. Also, for the same reasons, the average particle size of the abrasive has become smaller. However, in these polishing pads, abrasive grain debris and polishing debris are retained and likely to be adhered to the pad pores, so that clogging is likely to take place during continuous polishing. Consequently, the polishing rate is lowered and surface defects such as pits are generated in the polished substrate, so that frequent dressing of the polishing pad is necessitated, thereby lowering the workability of polishing and lowering productivity of the polished substrate. Therefore, there has been desired a polishing composition which reduces clogging to the pad pores. As polishing compositions in which the polishing pad is less likely to be clogged, a composition comprising a molybdate and a specified organic acid is disclosed in Japanese Patent Laid-Open No. Hei 7-216345; and a polishing composition comprising water, an alumina abrasive and a molybdate is disclosed in Japanese Patent Laid-Open No. Hei 5-311153. However, any of these composition do not satisfactorily meet the requirements of the reduction in surface defects and the reduction in clogging.

An object of the present invention is to provide a polishing composition in which clogging of a polishing pad is reduced, a process for producing a substrate comprising polishing a substrate to be polished using the polishing composition, and a process for preventing clogging of a polishing pad.

Another object of the present invention is to provide a polishing composition by which there are eliminated the problems in the lowering of the polishing rate when subjected to continuous polishing due to generation of clogging, and in the prevention of the generation of surface defects such as pits, whereby lowering the frequency of the dressing, and thereby improving the workability and the productivity; a process for producing a substrate comprising polishing a substrate to be polished with the polishing composition; and a process for preventing clogging of a polishing pad comprising applying the above-mentioned polishing composition.

These and other objects of the present invention will be apparent from the following description.

SUMMARY OF THE INVENTION

According to the present invention, there are provided:
(1) a polishing composition comprising an abrasive and water, wherein the polishing composition has an index of degree of sedimentation of 80 or more and 100 or less;
(2) a process for producing a substrate comprising polishing a substrate to be polished using the composition of item (1);
(3) a process for preventing clogging of a polishing pad comprising applying the composition of item (1);
(4) a process for preventing clogging of a polishing pad comprising applying the composition of item (1), to polishing with a polishing pad for a nickel-containing object to be polished; and
(5) a process for preventing clogging of a polishing pad comprising applying
    a composition comprising:
        a hydrophilic polymer having two or more hydrophilic groups in its molecule and a molecular weight of 300 or more, or a compound capable of dissolving nickel hydroxide at a pH of 8.0, and
        water,
to polishing with a polishing pad for a nickel-containing object to be polished.

DETAILED DESCRIPTION OF THE INVENTION

Figure 1:
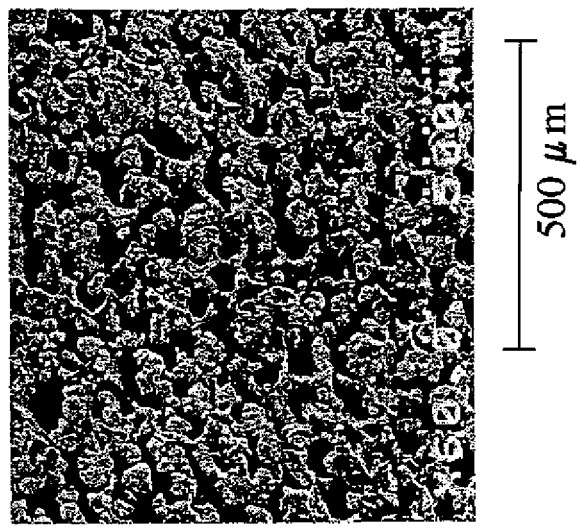
FIG. 1 is a view showing surface of a polishing pad before polishing.

The polishing composition of the present invention comprises an abrasive and water. The polishing composition has an index of degree of sedimentation of 80 or more and 100 or less, preferably 85 or more and 100 or less, more preferably 90 or more and 100 or less, from the viewpoint of reducing the clogging of the polishing pad. One of the great features of the present invention resides in that the polishing composition has an index of degree of sedimentation of 80 or more and 100 or less. Since the polishing composition has such a high index of degree of sedimentation, there can be exhibited remarkable effects such that the clogging of the polishing pad can be significantly reduced, so that the stable production of polished object can be maintained.

In the present invention, the term "index of degree of sedimentation" refers to a ratio of a sedimentation volume of a suspension to an entire volume of a test liquid suspension, wherein the test liquid suspension is prepared by adding nickel nitrate to a polishing composition in a given amount, and the index of degree of sedimentation can be obtained by the method described below. The index of degree of sedimentation is an index showing the extent of unlikelihood for the polishing composition of causing clogging in the polishing pad.

The index of degree of sedimentation used in the present invention is an index which is found by noting on the fact that the suspension in which a given amount of nickel nitrate is added shows the same level of dispersibility of the suspension as the polishing liquid during polishing. By using the index, there is an advantage that the unlikelihood for the polishing composition of causing clogging can be readily evaluated.

Incidentally, the index of degree of sedimentation is studied for conventional polishing compositions. As a result, those substantially having high indices of degree of sedimentation as in the present invention have not been found.

In the present invention, the index of degree of sedimentation is obtained by the following method.

A test solution to be used for the determination of the index of degree of sedimentation can be prepared in accordance with two cases described below. In a case where a polishing composition has an abrasive concentration exceeding 4.65% by weight, a composition having an abrasive concentration of 4.65% by weight is prepared by adding ion-exchanged water to the polishing composition, and to the resulting composition is added 0.62 parts by weight of nickel(II) nitrate hexahydrate (reagent special grade, purity: 98% or more as determined by quantitative analysis), based on 100 parts by weight of the composition having an abrasive concentration of 4.65% by weight. Next, a pH of the mixture is adjusted to 7.0 with a 25% by weight aqueous ammonia or a 20% by weight aqueous nitric acid, and ion-exchanged water is added thereto to give a test solution, so that the test solution has an abrasive concentration of 4.5% by weight. On the other hand, in the case where a polishing composition has an abrasive concentration of less than 4.65% by weight, 0.62 parts by weight of nickel(II) nitrate hexahydrate, based on 100 parts by weight of the polishing composition, is added to the polishing composition, and thereafter a pH of the mixture is adjusted to 7.0 with a 25% by weight aqueous ammonia and a 20% by weight aqueous nitric acid, to give a test solution.

Next, the above-mentioned test solution is thoroughly shaken until the test solution is suspended. One-hundred milliliters of the resulting test solution is placed in a glass colorimetric tube with volume scales (Japanese Industrial Standards, JIS K 0071), and thoroughly shaken until the test solution is re-suspended (shaking conditions: inverting the colorimetric tube, and thoroughly shaking the calorimetric tube in up-and-down movement until no sediments are recognized at its bottom). Thereafter, the above-mentioned glass calorimetric tube is allowed to stand at 20° C. for 30 minutes to separate the test solution into two layers, in which an upper supernatant layer is separated from a lower layer in which aggregates mainly composed of abrasive grains are suspended or dispersed. Thereafter, a sedimentation volume (unit: mL) is obtained from scale reading at an interface of the upper and lower layers of the test solution. A ratio of the sedimentation volume to an entire volume of the test solution is calculated therefrom, and the ratio is defined as the index of degree of sedimentation. When 100 mL of the test solution is used, the volume scale reading per se, in terms of mL units, of the above-mentioned sedimentation volume becomes the index of degree of sedimentation.

The process for elevating the above-mentioned index of degree of sedimentation cannot be generally limited, because the process differs depending upon the components of the polishing composition. The process includes, for instance, 1) a process comprising lowering a pH of the polishing composition (a process comprising lowering a pH of the polishing composition to 6 or less, preferably 3 or so, so that a pH of the mixture after polishing becomes less than 7.7); 2) a process comprising adding a clogging preventive described below to the polishing composition; and the like.

As the abrasive used in the present invention, any abrasives generally employed for polishing can be used. Examples of the abrasive include metals; carbides of metals or metalloids, nitrides of metals or metalloids, oxides of metals or metalloids, borides of metals or metalloids, diamond, and the like. The metals or metalloids include those elements belonging to the Groups 2A, 2B, 3A, 3B, 4A, 4B, 5A, 6A, 7A or 8 of the Periodic Table (long period form). Concrete examples of the abrasive include α-alumina particles, intermediate alumina particles such as γ-alumina particles, δ-alumina particles, θ-alumina particles, η-alumina particles and κ-alumina particles, alumina sol, silicon carbide particles, diamond particles, magnesium oxide particles, zinc oxide particles, cerium oxide particles, zirconium oxide particles, colloidal silica particles, fumed silica particles, and the like. It is preferable to use these abrasives in admixture of one or more kinds, from the viewpoint of increasing the polishing rate. Among them, α-alumina particles, intermediate alumina particles, cerium oxide particles, zirconium oxide particles, colloidal silica particles, fumed silica particles, and the like are more preferable, and α-alumina particles and intermediate alumina particles are especially preferable. Further, the combination of the α-alumina particles and the intermediate alumina particles (especially θ-alumina particles) described below is most preferable, from the viewpoints of the increase in the polishing speed, prevention in the surface defects and reduction in the surface roughness. In accordance with its use, the rough polishing of the Ni—P plated aluminum alloy substrate is preferably carried out with alumina particles such as α-alumina particles and the intermediate alumina particles, and the finish polishing of the Ni—P plated aluminum alloy substrate is preferably carried out with silica particles such as colloidal silica particles and fumed silica particles. In the polishing of the glassy materials, cerium oxide particles and alumina particles are preferable. In the polishing of semiconductor wafers and semiconductor elements, cerium oxide particles, alumina particles and silica particles are preferable.

The average primary particle size of the abrasive is preferably from 0.01 to 3 μm, more preferably from 0.01 to 1 μm, still more preferably from 0.01 to 0.8 μm, still more preferably from 0.02 to 0.8 μm, especially preferably from 0.02 to 0.5 μm, most preferably from 0.05 to 0.5 μm, from the viewpoint of increasing the polishing rate. Further, when the primary particles are aggregated to form a secondary particle, the average secondary particle size is preferably from 0.02 to 3 μm, more preferably from 0.05 to 3 μm, still more preferably from 0.05 to 1.5 μm, still more preferably from 0.1 to 1.5 μm, especially preferably from 0.1 to 1.2 μm, most preferably from 0.2 to 1.2 μm, from the viewpoint of increasing the polishing rate in the same manner as above, and from the viewpoint of reducing the surface roughness of a polished object. Especially when compared to those having a large particle size, the effect of the present invention is remarkable when using an abrasive having an average primary particle size of 1 μm or less, which is likely to have unstable dispersion.

The average primary particle size of the abrasive is obtained by subjecting the abrasive to an image analysis by observing with a scanning electron microscope (favorably from 3000 to 30000 times) or a transmission electron microscope (favorably from 10000 to 300000 times), and determining the particle size as a number-average particle size. In addition, the average secondary particle size can be determined as volume-average particle size by using a laser diffraction method.

The specific gravity of the abrasive is preferably from 2 to 6, more preferably from 2 to 5, from the viewpoints of the dispersibility, the feed ability to the polishing device and recovery and reuse.

The content of the abrasive is preferably from 1 to 40% by weight, more preferably from 2 to 30% by weight, still more preferably from 3 to 15% by weight, of the polishing composition, from the viewpoints of having economic advantages and making the surface roughness of a polished object small, thereby efficiently polishing the substrate.

In addition, it is preferable to add a clogging preventive for the polishing pad (hereinafter also simply referred to as "clogging preventive") to the polishing composition of the present invention, from the viewpoint of facilitating the elevation of the index of the degree of sedimentation. The clogging preventive includes a hydrophilic polymer compound, and a compound capable of dissolving nickel hydroxide at a pH of 8.0 (25° C.).

The hydrophilic polymer compound used in the present invention is a hydrophilic polymer having two or more hydrophilic groups in its molecule, and the hydrophilic groups can be of the same kind or different kinds. The hydrophilic polymer is a compound which acts at an interface of a dispersoid (solid substance such as an abrasive or polishing debris), thereby improving the dispersibility of the dispersoid in the dispersion medium.

Among the above-mentioned hydrophilic polymer compounds, a hydrophilic polymer having two or more hydrophilic groups and having a molecular weight of 300 or more is preferable, from the viewpoint of the clogging prevention described below.

The hydrophilic polymer compound has the number of hydrophilic groups of preferably two or more, more preferably five or more, from the viewpoint of the clogging prevention of the polishing pad. However, the hydrophilic polymer compound has the number of hydrophilic groups of preferably 10 or more, from the viewpoint of not causing the polishing pad from being clogged by the polishing debris (abrasive, debris such as small flakes of the polished object), namely maintaining the dispersion stability of the polishing debris by the electrostatic repulsion and steric repulsion between the surfaces of the polished debris, and the hydrophilic polymer compound has the number of hydrophilic groups of preferably 3000 or less, from the viewpoint of preventing instability due to interactions of the particles (e.g. due to cross-linking or the like) caused by the hydrophilic polymer and industrial availability. The hydrophilic polymer compound has the number of hydrophilic groups of more preferably from 10 to 2000, still more preferably from 20 to 1500, especially preferably from 20 to 1000.

In addition, the kinds of the hydrophilic groups are not particularly limited, and the hydrophilic groups may be of the same kinds or different kinds. The hydrophilic group includes, for instance, nonionic groups representatively exemplified by ether group (oxyethylene group and the like) and hydroxyl group; anionic groups representatively exemplified by carboxylate groups, sulfonate groups, sulfuric ester groups, and phosphate groups; cationic groups representatively exemplified by quaternary ammonium salts. Among them, ionic hydrophilic groups such as anionic groups and cationic groups are preferable, from the viewpoint of the clogging prevention of the polishing pad, and the anionic groups are more preferable. In addition, it is desired that the hydrophilic polymer has a weight-average molecular weight of from 300 to 1000000, preferably from 500 to 500000, more preferably from 1000 to 100000, especially preferably from 1000 to 50000, from the viewpoint of the clogging prevention of the polishing pad, in which the weight-average molecular weight is calculated as sodium polystyrenesulfonate as determined by gel permeation chromatography.

Concrete examples of the hydrophilic polymer compound used in the present invention are as follows. Here, those within quotation marks each indicate trade names.

Examples of the hydrophilic polymer compound having a nonionic hydrophilic group include polyethylene oxide adducts added to both terminals of polypropylene glycol, representatively exemplified by "Pluronic L44" (commercially available from ASAHI DENKA KOGYO K.K.), polyvinyl alcohols and derivatives thereof, polyethylene glycol (meth)acrylate polymers and copolymers thereof, and the like.

Examples of the hydrophilic polymer compound having an anionic hydrophilic group include (meth)acrylic acid (or salt thereof) polymers and copolymers thereof, representatively exemplified by polyacrylic acid; maleic acid (or salt thereof) polymers and copolymers thereof representatively exemplified by sodium salts of copolymers of styrene and maleic acid and sodium salts of copolymers of diisobutylene and maleic acid; polynaphthalenesulfonic acid (or salt thereof), representatively exemplified by sodium salt of formalin condensate of β-naphthalenesulfonic acid; polymelaminesulfonic acids (or salts thereof); sulfonated styrene (salt thereof) polymers and copolymers thereof, (meth)acryloyloxyethyl phosphate polymer, representatively exemplified by copolymers of (meth)acrylic acid and (meth)acryloyloxyethyl phosphate; sodium alginate; polysaccharides having an anionic group and derivative thereof, representatively exemplified by carboxymethyl cellulose.

The (meth)acrylic acid (salt thereof) polymers and copolymers thereof include "UC3120" (commercially available from TOAGOSEI CO., LTD.), "Poise 530" (commercially available from Kao Corporation), and the like. The polynaphthalenesulfonic acid (or salt thereof) includes "DEMOL N" (commercially available from Kao Corporation), "DEMOL AS" (commercially available from Kao Corporation), and the like. The polymelaminesulfonic acids (or salts thereof) include "Melflow" (commercially available from MITSUI CHEMICALS, INC.), and the like.

Next, examples of the hydrophilic polymer compound having a cationic hydrophilic group include polymers of quaternary ammonium monomers, and copolymers thereof, polymers of (meth)acryloyloxyethyl trimethylammonium chloride and copolymers thereof, polymers of (trimethylammonium chloride) ethyl (meth)acrylate and copolymers thereof, and the like.

The polymers of quaternary ammonium monomers and copolymers thereof include "Merquat-100" (commercially available from MATSUMOTO TRADING CO., LTD.), "Merquat-550" (commercially available from MATSUMOTO TRADING CO., LTD.), and the like.

Furthermore, examples of the hydrophilic polymer compound in which two or more hydrophilic polymers are admixed include hydrophilic monomer-modified polyvinyl alcohols, representatively exemplified by cationically modified- or carboxylated polyvinyl alcohols; copolymers of a hydrophilic monomer and (meth)acrylic acid (or (meth)acrylate), representatively exemplified by acrylamide/acrylic acid copolymer; copolymers of a hydrophilic monomer and a quaternary ammonium monomer, representatively exemplified by acrylic acid/dimethyldiallylammonium chloride copolymer; and the like. Among them, those having an ionic hydrophilic group as the hydrophilic group are preferable, and those having an anionic hydrophilic group are more preferable, from the viewpoint of the clogging prevention.

The hydrophilic monomer-modified polyvinyl alcohol includes "C-506" (commercially available from KURARAY CO., LTD.), "CM-308" (commercially available from KURARAY CO., LTD.), "KL318" (commercially available from KURARAY CO., LTD.), "SS2217" (commercially available from KURARAY CO., LTD.), and the like. The copolymers of the hydrophilic monomer and (meth)acrylic acid (or (meth)acrylate) include "Aron A6016" (commercially available from TOAGOSEI CO., LTD.), "FC-900" (commercially available from NIPPON SHOKUBAI CO., LTD.), and the like. The copolymer of a hydrophilic monomer and a quaternary ammonium monomer include "Merquat-280" (commercially available from MATSUMOTO TRADING CO., LTD.), and the like.

Among those having an anionic hydrophilic group, maleic acid (or maleate) copolymers, representatively exemplified by sodium salts of copolymers of styrene and maleic acid and sodium salts of copolymers of diisobutylene and maleic acid; polynaphthalenesulfonic acid (or polynaphthalenesulfonate), representatively exemplified by sodium salts of formalin condensate of β-naphthalenesulfonic acid; sodium alginate; polysaccharides having an anionic group and derivative thereof, representatively exemplified by carboxymethyl cellulose are especially preferable.

Another preferable clogging preventive is a compound capable of dissolving nickel hydroxide at a pH of 8.0 (25° C.). This compound has a property such that its aqueous solution prepared below clearly has no precipitates of nickel hydroxide or is in a transparent aqueous solution state without any suspensions as evaluated by naked eyes at 25° C. immediately after the pH adjustment to 8.0 described below. The aqueous solution to be evaluated is prepared by adding 2% by weight of nickel(II) nitrate hexahydrate (reagent special grade, purity: 98% or more as determined by quantitative analysis) and 0.4% by weight of the compound to water, and adjusting its pH with a 25% by weight aqueous ammonia or a 20% by weight aqueous nitric acid. The compound mentioned above includes a compound containing carboxyl group, phosphate group, or the like, preferably a compound containing carboxyl group. Examples of the compound include citric acid, α-amino acids having 2 to 3 carbon atoms, and enolic organic acids having 3 to 10 carbon atoms. Among them, from the viewpoint of increase in the dissolution of nickel hydroxide and from the viewpoint of the clogging prevention, glycine, ascorbic acid and citric acid are preferable, glycine and citric acid are more preferable, and citric acid is most preferable.

In addition, of the above-mentioned clogging preventives, the acid compounds can be used in the form of salts. The salts of these acids are not particularly limited. Concretely, there are included salts with a metal, ammonium, an alkylammonium, an organic amine, and the like. Concrete examples of the metal include metals belonging to Group 1A, 1B, 2A, 2B, 3A, 3B, 4A, 6A, 7A or 8 of the Periodic Table (long period form). Among these metals, from the viewpoint of reducing the clogging, the metals belonging to Group 1A, 3A, 3B, 7A or 8 of the Periodic Table are preferable, and the metals belonging to Group 1A, 3A or 3B of the Periodic Table are more preferable. Sodium and potassium belonging to Group 1A are most preferable. Concrete examples of the alkylammonium include tetramethylammonium, tetraethylammonium, tetrapropylammonium, tetrabutylammonium, and the like. Concrete examples of the organic amine include dimethylamine, trimethylamine, alkanolamines, and the like. Among these salts, ammonium salts, sodium salts and potassium salts are especially preferable.

The content of the above-mentioned clogging preventive is preferably 0.0001% by weight or more of the entire amount of the polishing composition, from the viewpoint of the clogging prevention and from the viewpoint of polishing performance, and the content of the clogging preventive is preferably 5% by weight or less of the entire amount of the polishing composition, from the viewpoint of economic advantages and from the viewpoint of improvement in the surface quality of the polished substrate. In the case where the clogging preventive is a compound capable of dissolving nickel hydroxide at a pH of 8.0 (25° C.), the content of the compound is preferably from 0.01 to 5% by weight, more preferably from 0.01 to 3% by weight, still more preferably from 0.01 to 1.5% by weight, especially preferably from 0.02 to 1% by weight, of the entire polishing composition. Alternatively, in the case where the clogging preventive is a hydrophilic polymer having two or more hydrophilic groups in its molecule and having a molecular weight of 300 or more, the content of the hydrophilic polymer is preferably from 0.0001 to 5% by weight, more preferably from 0.0005 to 3% by weight, still more preferably from 0.001 to 1.5% by weight, especially preferably from 0.005 to 0.5% by weight, of the entire polishing composition, from the viewpoint of increasing the polishing rate. The above-mentioned clogging preventive can be used alone or in admixture of two or more kinds.

In addition, in the polishing composition of the present invention, other components can be formulated as desired. Other components include, for instance:

compound group (A): carboxylic acids having 2 to 20 carbon atoms and having either OH group or groups or SH group or groups, monocarboxylic acids having 1 to 20 carbon atoms, dicarboxylic acids having 2 to 3 carbon atoms, and salts thereof; and compound group (B): polycarboxylic acids having 4 or more carbon atoms and having neither OH group or groups nor SH group or groups, aminocarboxylic acids, amino acids, and salts thereof.

Among these compound groups, it is desired that the polishing composition preferably comprises one or more of the compounds in the above compound groups, more preferably compounds from both of the two compound groups. Also, one or more compounds can be respectively selected from each compound group and added to the polishing composition.

The compound group (A) used in the present invention has an action of reducing edge rounding of end side of a substrate (roll-off). The compound of the compound group (A) includes one or more compounds selected from the group consisting of carboxylic acids having 2 to 20 carbon atoms and having either OH group or groups or SH group or groups, monocarboxylic acids having 1 to 20 carbon atoms, dicarboxylic acids having 2 to 3 carbon atoms, and salts thereof.

The carboxylic acid having 2 to 20 carbon atoms and having either OH group or groups or SH group or groups includes oxycarboxylic acids, and compounds in which an oxygen atom of the OH group of the oxycarboxylic acid is substituted by a sulfur atom. It is desired that the number of carbon atoms of these carboxylic acids is from 2 to 20, preferably from 2 to 12, more preferably from 2 to 8, still more preferably from 2 to 6, from the viewpoint of the solubility to water. In addition, as oxycarboxylic acids, those having a hydroxyl group at α-position of a carboxyl group are preferable, from the viewpoint of the roll-off reduction. Also, oxypolycarboxylic acids having two or more carboxyl groups are preferable.

It is desired that the number of carbon atoms of the monocarboxylic acid is from 1 to 20, preferably from 1 to 12, more preferably from 1 to 8, still more preferably from 1 to 6, from the viewpoint of the solubility to water.

The dicarboxylic acid is those having 2 to 3 carbon atoms, namely oxalic acid and malonic acid, from the viewpoint of the roll-off reduction. Among these compounds in the compound group (A), the oxycarboxylic acids are preferable, from the viewpoint of increasing the polishing rate. In addition, the dicarboxylic acids are preferable, from the viewpoint of the roll-off reduction.

Concrete examples of the carboxylic acid having 2 to 20 carbon atoms having either OH group or groups or SH group or groups include glycolic acid, mercaptosuccinic acid, thioglycolic acid, lactic acid, β-hydroxypropionic acid, malic acid, tartaric acid, citric acid, isocitric acid, allocitric acid, gluconic acid, glyoxylic acid, glyceric acid, ascorbic acid, mandelic acid, tropic acid, benzilic acid, salicylic acid, and the like. Concrete examples of the monocarboxylic acid include formic acid, acetic acid, propionic acid, butyric acid, isobutyric acid, valeric acid, isovaleric acid, hexanoic acid, heptanoic acid, 2-methylhexanoic acid, octanoic acid, 2-ethylhexanoic acid, nonanoic acid, decanoic acid, lauric acid, and the like. Among them, acetic acid, oxalic acid, malonic acid, glycolic acid, lactic acid, malic acid, tartaric acid, glyoxylic acid, citric acid and gluconic acid are preferable; oxalic acid, malonic acid, glycolic acid, lactic acid, malic acid, tartaric acid, glyoxylic acid, citric acid and gluconic acid are more preferable. Each of the monocarboxylic acid and the dicarboxylic acid used in the present invention is selected from carboxylic acids having neither OH group or groups nor SH group or groups.

The salts of these acids are not particularly limited. Concretely, there are included salts with a metal, ammonium, an alkylammonium, an organic amine, and the like. Concrete examples of the metal include metals belonging to Group 1A, 1B, 2A, 2B, 3A, 3B, 4A, 6A, 7A or 8 of the Periodic Table (long period form). Among these metals, from the viewpoint of the roll-off reduction, those metals belonging to Group 1A, 3A, 3B, 7A or 8 of the Periodic Table are preferable, and those metals belonging to Group 1A, 3A or 3B of the Periodic Table are more preferable. Sodium and potassium belonging to Group 1A are most preferable.

Concrete examples of the alkylammonium include tetramethylammonium, tetraethylammonium, tetrabutylammonium, and the like.

Concrete examples of the organic amine include dimethylamine, trimethylamine, alkanolamines, and the like.

Among these salts, ammonium salts, sodium salts and potassium salts are especially preferable.

These compounds of the compound group (A) can be used alone or in admixture of two or more kinds.

The total amount of the compound group (A) is preferably from 0.01 to 5% by weight, more preferably from 0.015 to 3% by weight, still more preferably from 0.03 to 2% by weight, of the polishing composition, from the viewpoint of improvement in roll-off, and from the viewpoint of economic advantages.

The compound group (A) also has an action of preventing clogging of the polishing pad.

The compound group (B) usable in the present invention has an action of increasing the polishing rate. The compound group (B) includes polycarboxylic acids having 4 or more carbon atoms and having neither OH group or groups nor SH group or groups, aminocarboxylic acids, amino acids, and salts thereof.

Among the polycarboxylic acids having 4 or more carbon atoms and having neither OH group or groups nor SH group or groups, those having 4 to 20 carbon atoms are preferable, more preferably 4 to 10 carbon atoms, from the viewpoint of increasing the polishing rate. The polycarboxylic acid has the number of carboxyl groups in one molecule of from 2 to 10, preferably from 2 to 6, more preferably from 2 to 4. Also, from the same viewpoint as above, the aminocarboxylic acids preferably have the number of amino groups in one molecule of from 1 to 6, more preferably from 1 to 4, and the number of carboxyl groups in one molecule of preferably from 1 to 12, more preferably 2 to 8, and a number of carbon atoms of preferably from 1 to 30, more preferably from 1 to 20. From the same viewpoint as above, the amino acids preferably have a number of carbon atoms of preferably from 2 to 20, preferably from 2 to 10.

Concrete examples thereof include succinic acid, maleic acid, fumaric acid, glutaric acid, citraconic acid, itaconic acid, tricarballylic acid, adipic acid, propane-1,1,2,3-tetracarboxylic acid, butane-1,2,3,4-tetracarboxylic acid, diglycolic acid, nitrilotriacetic acid, ethylenediaminetetraacetic acid (EDTA), diethylenetriaminepentaacetic acid (DTPA), hydroxyethylethylenediaminetetraacetic acid (HEDTA), triethylenetetraminehexaacetic acid (TTHA), dicarboxymethylglutamic acid (GLDA), glycine, alanine, and the like.

Among them, succinic acid, maleic acid, fumaric acid, glutaric acid, citraconic acid, itaconic acid, tricarballylic acid, adipic acid, diglycolic acid, nitrilotriacetic acid, ethylenediaminetetraacetic acid and diethylenetriaminepentaacetic acid are preferable, and succinic acid, maleic acid, fumaric acid, citraconic acid, itaconic acid, tricarballylic acid, diglycolic acid, ethylenediaminetetraacetic acid and diethylenetriaminepentaacetic acid are more preferable.

In addition, the salts of these acids are not particularly limited. Concretely, there are included salts with a metal, ammonium, an alkylammonium, an organic amine, and the like. Concrete examples of the metal include metals belonging to Group 1A, 1B, 2A, 2B, 3A, 3B, 4A, 6A, 7A or 8 of the Periodic Table (long period form). Among these metals, from the viewpoint of increasing the polishing rate, the metals belonging to Group 1A, 3A, 3B, 7A or 8 of the Periodic Table are preferable, and the metals belonging to Group 1A, 3A, 3B or 8 of the Periodic Table are more preferable. Sodium and potassium belonging to Group 1A, cerium belonging to Group 3A, aluminum belonging to Group 3B and iron belonging to Group 8 are most preferable.

Concrete examples of the alkylammonium include tetramethylammonium, tetraethylammonium, tetrabutylammonium, and the like.

Concrete examples of the organic amine include dimethylamine, trimethylamine, alkanolamines, and the like.

Among these salts, ammonium salts, sodium salts, potassium salts and aluminum salts are especially preferable.

These compounds of the compound group (B) can be used alone or in admixture of two or more kinds.

A total content of the compound group (B) is preferably from 0.01 to 10% by weight, more preferably from 0.02 to 7% by weight, still more preferably from 0.03 to 5% by weight of the polishing composition, from the viewpoint of the effect of accelerating polishing, the viewpoint of economic advantages, and the viewpoint of improvement in the surface qualities.

In addition, the polishing composition of the present invention may further comprise an intermediate alumina or alumina sol as a surface roughness-reducing agent. In the present invention, intermediate alumina is a generic term referring to alumina particles other than α-alumina particles, which is considered as an abrasive component in the present invention. Concrete examples thereof include γ-alumina particles, δ-alumina particles, θ-alumina particles, η-alumina particles, κ-alumina particles and mixtures thereof. Among them, the following intermediate aluminas are preferable from the viewpoints of increasing the polishing rate and reducing surface roughness. The crystal forms of the intermediate alumina preferably include γ-alumina, δ-alumina, θ-alumina, η-alumina, and mixtures thereof, more preferably γ-alumina, δ-alumina, θ-alumina, and mixtures thereof, especially preferably γ-alumina and θ-alumina. In addition, the intermediate alumina has a specific surface area (BET method) of preferably from 30 to 300 $m^2/g$, more preferably from 50 to 200 $m^2/g$, and an average particle size of preferably from 0.01 to 5 μm, more preferably from 0.05 to 5 μm, still more preferably from 0.1 to 3 μm, especially preferably from 0.1 to 1.5 μm. The average particle size can be determined as a volume-average particle size by using a laser diffraction method (for instance, one commercially available form Horiba, LTD. under the trade name of LA-920). In addition, the content of each of the alkali metal and the alkaline earth metal in the intermediate alumina particles is preferably 0.1% by weight or less, more preferably 0.05% by weight or less, especially preferably 0.01% by weight or less.

For instance, in a case where aluminum hydroxide, an alumina sol or the like which has a relatively large specific surface area and a low content of the alkali metal and the alkaline earth metal is used as a raw material, since there is little fusion of the intermediate alumina produced and the particle strength is small, no surface defects are caused on a polished substrate, thereby making it especially effective in reducing the surface roughness of a polished substrate.

As the raw material which can be used in the preparation of the intermediate alumina, there can be used, for instance, aluminum hydroxide, alumina sols, and the like, which can be represented by the formulas $Al(OH)_3$, $Al_2O_3 \cdot 3H_2O$, AlOOH, $Al_2O_3 \cdot H_2O$, and $Al_2O_3 \cdot nH_2O$, wherein n is a number of 1 to 3. The specific surface area of the raw material is preferably 10 $m^2/g$ or more, more preferably 30 $m^2/g$ or more, especially preferably 50 $m^2/g$ or more. In addition, the total content of the alkali metal and the alkaline earth metal in the raw material is preferably 0.1% by weight or less, more preferably 0.05% by weight or less, especially preferably 0.03% by weight or less. Further, in a case where an intermediate alumina is prepared by thermally dehydrating aluminum hydroxide, a forcible introduction of a dry air or nitrogen gas during baking is further effective in the reduction of surface defects and surface roughness of the polished substrate. Here, the above-mentioned thermal dehydration treatment can be carried out by a conventional method.

These intermediate aluminas are adjusted to a given particle size by wet pulverization or dry pulverization by using a pulverizer such as a ball-mill, a beads-mill, a high-pressure homogenizer or a jet mill as occasion demands.

In addition, the alumina sol refers to those which can be represented by the formulas AlOOH, $AlOOH \cdot nH_2O$, wherein n is a number of 1 to 3, for instance, $Al_2O_3 \cdot H_2O$ and the like. The crystal forms of the alumina sol include boehmite, pseudo-boehmite and amorphous. The alumina sol can be prepared by subjecting aluminum hydroxide, for instance, gibbsite, to a hydrothermal treatment at 250° C. or so, or hydrolyzing an aluminum alcoholate. The alumina sol has an average particle size of preferably from 0.01 to 5 μm, more preferably from 0.05 to 5 μm, still more preferably from 0.1 to 3 μm, especially preferably from 0.1 to 1.5 μm. The average particle size can be determined as a volume-average particle size by using a laser diffraction method. The alumina sol has a specific surface area (BET method) of preferably from 30 to 300 $m^2/g$, more preferably from 50 to 200 $m^2/g$.

Since the intermediate alumina and the alumina sol are used together with the compound group (A) and the compound group (B), the increase in the polishing rate and prevention in surface defects such as pits can be further accelerated. In this case, the intermediate alumina and the alumina sol can be used alone or in admixture. Especially, the intermediate alumina is more preferable, from the viewpoints of the increase in the polishing rate, the reduction in the clogging of the polishing pad, the extent of the effect of preventing surface defects and the like, and the effect of reducing the surface roughness.

A total content of the intermediate alumina and the alumina sol in the polishing composition is preferably from 1 to 100 parts by weight, more preferably from 2 to 70 parts by weight, still more preferably from 4 to 40 parts by weight, based on 100 parts by weight of the abrasive excluding the intermediate alumina and the alumina sol, from the viewpoints of economic advantages, the effect of accelerating polishing, the effect of reducing the clogging of the polishing pad, the effect of reducing the surface roughness of a polished object, and from the viewpoint of obtaining the capability of preventing surface defects such as pits.

Other components include, for instance, inorganic acids and salts thereof oxidizing agents, thickeners, anticorrosive agents, surfactants, and the like. Concrete examples of the inorganic acids and salts thereof include nitric acid, oxoacid, salts of oxoacid, sulfuric acid, lithium nitrate, lithium sulfate, sodium nitrate, sodium sulfate, sodium thiosulfate, sodium chloride, sodium acetate, potassium nitrate, potassium sulfate, potassium chloride, magnesium nitrate, magnesium sulfate, magnesium chloride, magnesium acetate, calcium nitrate, calcium chloride, zinc sulfate, zinc chloride, zinc acetate, aluminum nitrate, aluminum sulfate, aluminum phosphate, aluminum chloride, potassium alum, nickel nitrate, nickel sulfate, nickel formate, nickel acetate, iron nitrate, sodium nitrite, potassium nitrite, calcium nitrite, magnesium nitrite, hydrogen peroxide, sodium peroxide, potassium peroxide, calcium peroxide, barium peroxide, magnesium peroxide, sodium peroxocarbonate, potassium peroxocarbonate, ammonium peroxocarbonate, sodium peroxosulfate, potassium peroxosulfate, ammonium peroxosulfate, sodium peroxophosphate, potassium peroxophosphate, ammonium peroxophosphate, sodium peroxoborate, potassium peroxoborate, ammonium peroxoborate, perpropionic acid, tert-butyl hydroperoxide, performic acid, peracetic acid, 2,4-dinitrophenol, and the like.

These other components may be used alone or in admixture of two or more kinds. In addition, the content of the other components is preferably from 0.05 to 20% by weight, more preferably from 0.05 to 10% by weight, still more preferably from 0.05 to 5% by weight, of the polishing composition, from the viewpoint of increasing the polishing rate, from the viewpoint of exhibiting the respective functions and from the viewpoint of economic advantages.

In addition, the polishing composition of the present invention can optionally comprise other component including a disinfectant and an antibacterial agent, such as tetramethylammonium chloride, tetraethylammonium chloride, tetramethylammonium hydroxide, tetraethylammonium hydroxide, benzalkonium chloride, and benzethonium chloride. The content of these disinfectants and antibacterial agents is preferably from 0.001 to 0.1% by weight, more preferably from 0.01 to 0.05% by weight, still more preferably from 0.01 to 0.02% by weight, of the polishing composition, from the viewpoint of exhibiting the respective functions and from the viewpoint of not affecting the polishing performance and substrate properties.

Water in the polishing composition of the present invention is used as a medium, and the content of water is preferably from 19.9 to 97.9% by weight, more preferably 40 to 97% by weight, still more preferably from 60 to 97% by weight, from the viewpoint of efficiently polishing the object to be polished.

The concentration of each component of the above-mentioned polishing composition is a preferable concentration during polishing, and it may be a concentration during the preparation of the composition. The composition is usually prepared as a concentrate, and the concentrate is diluted upon use in many cases.

The polishing composition of the present invention can be prepared by adding an optional component such as a clogging preventive, the compound group (A) and the compound group (B) as occasion demands in proper amounts to water and an abrasive mentioned above, and mixing the components by a known process.

It is preferable that the pH of the polishing composition is appropriately adjusted depending upon the kinds and the required qualities and the like of the substrate to be polished. For instance, the pH of the polishing composition is preferably from 2 to 12, from the viewpoints of the cleanability of the substrate, the anti-corrosiveness of the working machine, and the safety of the operator. In addition, in a case where a substrate to be polished is a substrate for precision parts which is mainly made of a metal such as an Ni—P plated aluminum alloy substrate, the pH is more preferably from 2 to 9, especially preferably from 3 to 8, from the viewpoints of increasing the polishing rate and improving the surface qualities. When the polishing composition is used for polishing a semiconductor wafer, a semiconductor element, or the like, especially for polishing a silicon substrate, a poly-silicon film, an $SiO_2$ film, or the like, the pH is preferably from 7 to 12, more preferably from 8 to 12, especially preferably from 9 to 11, from the viewpoints of increasing the polishing rate and improving the surface qualities. Also, in a case where a substrate to be polished is an Ni—P plated aluminum alloy substrate, the pH is preferably from 2 to 10, more preferably from 2 to 9, still more preferably from 2 to 8, still more preferably from 2 to 7, especially preferably from 2 to 5, most preferably from 2 to 4, from the viewpoint of reducing the clogging of the polishing pad. The pH can be adjusted by adding properly an inorganic acid such as nitric acid or sulfuric acid, an organic acid, a metal salt thereof or an ammonium salt thereof, or a basic substance such as aqueous ammonia, sodium hydroxide, potassium hydroxide or amine in a desired amount as occasion demands. Here, pH is determined at 20° C. with a known pH meter.

The polishing composition of the present invention having the above constituents has an effect of reducing clogging of the polishing pad. Therefore, the clogging of the polishing pad can be prevented by the use of the polishing composition. Embodiments of the use of the polishing composition are not particularly limited, as long as embodiments are based on a known polishing process using a polishing pad. An example of such embodiments includes a polishing process of a substrate to be polished described below and the like.

The polishing pad used in the present invention may be a polishing pad used during the polishing of an object to be polished. The polishing pad includes a polishing pad made of nonwoven fabric or a porous organic polymer, and a fixed grinding wheel or a polishing pad in which the grinding wheel is fixed in the polishing pad, and the like. Especially, the polishing pad made of nonwoven fabric or a porous organic polymer is preferable.

The polishing pad is not particularly limited as to its shape, size and the like. In addition, the materials for the polishing pad is not particularly limited. The materials for the polishing pad include organic polymers such as urethane, composites in which various additives such as carbon or ceria are incorporated into the organic polymer; and the like.

In the present invention, the clogging preventing effect of the polishing pad can be estimated by, for instance, a microscopic observation of the polishing pad surface after polishing or an observation with a scanning electron microscope, or by a ratio of decreasing the polishing rate when an object to be polished is subjected to continuous polishing.

In addition, in the polishing process for a substrate for precision parts, by using the clogging preventive in the present invention, there are some advantages that the clogging of the polishing pad can be remarkably lowered, and that the polishing rate is increased and the roll-off is reduced. The term "roll-off" as referred to herein means an edge rounding of end side of a substrate to be polished.

The process for producing a substrate of the present invention comprises polishing a substrate to be polished by using the polishing composition of the present invention, or preparing a polishing liquid by mixing each component so as to give the composition of the polishing composition of the present invention. Especially, the substrate for precision parts can be suitably produced.

The material for an object to be polished as representatively exemplified by the substrate to be polished used in the present invention includes, for instance, metals or metalloids such as silicon, aluminum, nickel, tungsten, copper, tantalum and titanium; alloys made of these metals as main components; glassy substances such as glass, glassy carbon and amorphous carbons; ceramic materials such as alumina, silicon dioxide, silicon nitride, tantalum nitride and titanium nitride; resins such as polyimide resins; and the like. Among them, it is preferable that an object to be polished is made of a metal such as aluminum, nickel, tungsten or copper, or made of an alloy containing these metals as the main components; or an object to be polished is a semiconductor substrate made of semiconductor elements containing these metals. Especially, in a case where the polishing composition of the present invention is used when polishing a nickel-containing substrate to be polished such as an aluminum alloy substrate plated with Ni—P, it is preferable because the clogging of the polishing pad can be efficiently reduced. In this case, by properly adding the above-mentioned clogging preventive, the compound group (A), the compound group (B), the intermediate alumina or alumina sol to the polishing composition of the present invention, it is preferable because the extent of roll-off can be made small, the polishing rate is increased, and the surface roughness can be reduced without further causing surface defects.

Representative nickel-containing substrates to be polished which are subjects for polishing in the present invention include, for instance, semiconductor substrates made of a metal nickel, an alloy containing nickel, a metalloid or an oxide, and semiconductor elements containing these. Especially, Ni—P plated or Ni—Fe plated disk substrates are preferable, and the substrate to be plated includes a metal substrate made of an aluminum alloy or the like, a ceramic substrate made of glass, carbon or the like, or a substrate made of a resin, and the like.

The shape for the substrate to be polished is not particularly limited. For instance, those having shapes containing planar portions such as disks, plates, slabs and prisms, or shapes containing curved portions such as lenses can be subjects for polishing with the polishing composition of the present invention. Among them, those having the disk-shaped substrates are especially preferable in polishing.

The polishing composition of the present invention can be favorably used in polishing the substrate for precision parts.

For instance, the polishing composition is suitable for polishing substrates for precision parts such as substrates for magnetic recording media such as magnetic disks, optical disks, opto-magnetic disks, and the like; photomask substrates, optical lenses, optical mirrors, optical prisms and semiconductive substrates. The polishing of the semiconductive substrates comprises the steps of polishing a silicon wafer (bare wafer), forming separation layer for an embedding element, flattening an interlayer insulation film, forming an embedded metal line, and forming embedded capacitor, and the like. The polishing composition of the present invention is especially suitable for polishing a magnetic disk substrate.

The process for producing a substrate of the present invention includes, for instance, a process for producing a substrate comprising clamping a substrate with polishing disks to which a polishing cloth made of nonwoven organic polymer fabric or the like, is pasted; feeding a polishing composition of the present invention to a polishing surface; and moving the polishing disks or the substrate, with applying a given pressure.

As described above, when the polishing composition of the present invention is used for polishing a substrate for precision parts, especially a substrate to be polished made of Ni—P plated aluminum alloy, clogging of the polishing pad can be remarkably prevented, and consequently, there can be eliminated the problems in the lowering of the polishing rate when subjected to continuous polishing due to generation of clogging, and in the prevention of the generation of surface defects such as pits, whereby the frequency of the dressing can be lowered, and the workability and the productivity can be improved.

Especially, by properly adding the clogging preventive, the compounds of the compound group (A) and the compound group (B), the intermediate alumina or alumina sol mentioned above, and the like to the polishing composition of the present invention, in addition to the reduction in the clogging of the polishing pad, the polishing rate can be increased without causing surface defects on the surface, so that a high-quality substrate having reduced surface roughness and further reduced roll-off can be efficiently produced.

The polishing composition of the present invention is especially effective in the polishing method, and the polishing composition can be similarly applied to polishing steps other than the polishing method, for instance, lapping method, and the like.

The present invention also relates to a process for preventing clogging of a polishing pad. The process for preventing clogging of a polishing pad of the present invention includes a process for preventing clogging of a polishing pad with the above-mentioned polishing composition of the present invention, concretely a process comprising applying the polishing composition of the present invention, to polishing with a polishing pad for a nickel-containing object to be polished when the nickel-containing object to be polished.

Also, the present invention relates to a process for preventing clogging of a polishing pad comprising applying a composition not containing an abrasive, to polishing with a polishing pad for a nickel-containing object to be polished. Specifically, a process for preventing clogging of a polishing pad comprises applying a composition comprising:
  a hydrophilic polymer having two or more hydrophilic groups in its molecule and a molecular weight of 300 or more, or a compound capable of dissolving nickel hydroxide at a pH of 8.0, and
  water, to polishing with a polishing pad for a nickel-containing object to be polished is polished with a polishing pad.

By using the process for preventing clogging of a polishing pad as mentioned above, there can be eliminated the problems in the lowering of the polishing rate when subjected to continuous polishing due to generation of clogging, and in the prevention of the generation of surface defects such as pits, whereby the dressing frequency of the polishing pad can be lowered, and the workability and the productivity in polishing can be improved.

As described above, each requirements for the nickel-containing object to be polished, the polishing pad, the polishing process, the hydrophilic polymer or the compound capable of dissolving nickel hydroxide at a pH of 8.0, the carboxylic acids, α-amino acid, and the enolic organic acids may be the same as those described above.

EXAMPLES

Examples I-1 to I-12 and Comparative Examples I-1 to I-10

There were mixed together the components shown in Table 1 including, as abrasives, α-alumina particles having a primary average particle size of 0.23 μm and a secondary average particle size of 0.65 μm and θ-alumina particles having an average particle size of 0.20 μm was prepared, and balance ion-exchanged water (pH being adjusted with aqueous ammonia), to give 100% by weight of a polishing composition. A mixture prepared by adding 5-folds amount of ion-exchanged water to this polishing composition was used for the polishing test.

Next, the above-mentioned polishing composition was diluted with ion-exchanged water so that the abrasive concentration was 4.65% by weight, and thereafter 1.0% by weight of nickel(II) nitrate hexahydrate was added with stirring. Further, pH was adjusted to 7.0 with a 25% by weight aqueous ammonia, to prepare a test solution for sedimentation volume. The index of degree of sedimentation was determined as mentioned above.

Table 1 and 2 show the index of degree of sedimentation using the test solution for sedimentation volume and an ability of preventing clogging of the polishing composition (ratio of the polishing rate of 20th polishing to the ratio of the first polishing rate).

In Examples I-1 to I-12 and Comparative Examples I-1 to I-10, the polishing rate for the aluminum alloy substrate of the polishing composition was determined with a double-sided processing machine under Set Conditions I for Double-Sided Processing Machine given below.

Set Conditions I for Double-Sided Processing Machine are as follows.

Set Conditions I for Double-Sided Processing Machine
Double-sided processing machine: double-sided processing machine, Model 9B, manufactured by SPEEDFAM CO., LTD.
Processing pressure: 9.8 kPa
Polishing Pad: "DPM2000" (commercially available from Rodel Nitta K.K.).
Disc rotational speed: 50 r/min
Feeding flow rate for a polishing composition: 100 mL/min
Polishing time period: 5 minutes
Number of substrate introduced: 10

The polishing rate is defined as follows. The thickness of the above-mentioned aluminum alloy substrate is determined by using a thickness tester (a laser thickness tester, commercially available from Mitsutoyo Corporation, Model LGH-110/LHC-11N). A rate of decrease in the thickness was obtained from the changes in the thicknesses of the aluminum alloy substrate before and after polishing. This rate of decrease in the thickness is defined as the polishing rate.

In addition, a clogging preventing ability is evaluated by polishing the aluminum alloy substrate continuously for twenty times without carrying out dressing under the above-mentioned polishing conditions and estimating the clogging preventing effect by using the ratio of the polishing rate of 20th polishing to the ratio of the first polishing rate as a measure for the clogging preventing ability. Here, the larger the ratio of the polishing rate of 20th polishing to the ratio of the first polishing rate, the higher the clogging preventing effect.

It can be seen from the results of Tables 1 and 2 that the polishing compositions of Examples I-1 to I-12 having an index of degree of sedimentation of 80 or more and 100 or less all show improvements in the clogging preventing ability, as compared to the polishing compositions obtained in Comparative Examples I-1 to I-10.

Examples II-1 to II-9 and Comparative Examples II-1 to II-6

There were mixed together 7 parts by weight of an abrasive [α-alumina (purity: about 99.9%) having primary average particle size: 0.23 μm, and secondary average particle size: 0.53 μm], a given amount of a clogging preventive used in Examples or a compound used in Comparative Examples as

TABLE 1

| | Composition of Polishing Composition (% by weight)* | | | | | Properties | |
| | | | | | | Index of Degree of Sedimentation | Clogging Preventing Ability |
| Ex. No. | Abrasive | Clogging Preventive | Compound Group (A) | Compound Group (B) | Intermediate Alumina | pH | |
| I-1 | α-Alumina (16) | Citric acid (0.50) | Glycolic acid (0.50) | Itaconic acid (0.50) | θ-Alumina (4) | 3.0 | 97 | 0.99 |
| I-2 | α-Alumina (16) | Citric acid (0.50) | Glycolic acid (0.50) | Maleic acid (1.89) | θ-Alumina (4) | 3.0 | 96 | 0.99 |
| I-3 | α-Alumina (16) | — | Glycolic acid (0.50) | Itaconic acid (0.50) | θ-Alumina (4) | 3.0 | 93 | 0.98 |
| I-4 | α-Alumina (16) | — | Glycolic acid (0.50) | Maleic acid (1.89) | θ-Alumina (4) | 3.0 | 93 | 0.97 |
| I-5 | α-Alumina (16) | Citric acid (0.10) | Glycolic acid (0.50) | Maleic acid (1.89) | θ-Alumina (4) | 7.0 | 90 | 0.97 |
| I-6 | α-Alumina (16) | Glycine (0.10) | Glycolic acid (0.50) | Maleic acid (1.89) | θ-Alumina (4) | 7.0 | 87 | 0.84 |
| I-7 | α-Alumina (16) | Sodium salt of a copolymer of diisobutylene and maleic acid[1) (0.10) | Glycolic acid (0.50) | Maleic acid (1.89) | θ-Alumina (4) | 7.0 | 83 | 0.88 |
| I-8 | α-Alumina (16) | Sodium salt of formalin condensate of β-naphthalenesulfonic acid[2) (0.10) | Glycolic acid (0.50) | Maleic acid (1.89) | θ-Alumina (4) | 7.0 | 84 | 0.85 |
| I-9 | α-Alumina (16) | Alginic acid (0.10) | Glycolic acid (0.50) | Maleic acid (1.89) | θ-Alumina (4) | 7.0 | 82 | 0.82 |
| I-10 | α-Alumina (20) | Citric acid (0.10) | Glycolic acid (0.50) | Maleic acid (1.89) | — | 7.0 | 84 | 0.85 |
| I-11 | α-Alumina (20) | Citric acid (0.10) | Glycolic acid (0.50) | — | — | 7.0 | 83 | 0.84 |
| I-12 | α-Alumina (16) | Citric acid (0.10) | Glycolic acid (0.50) | Maleic acid (1.89) | θ-Alumina (4) | 5.0 | 93 | 0.98 |

*Balance being ion-exchanged water.
[1)Molar ratio of diisobutylene/maleic acid: 1/1 (weight-average molecular weight: 4000)
[2)Weight-average molecular weight: 4000

TABLE 2

| | Composition of Polishing Composition (% by weight)* | | | | | Properties | |
| | | | | | | Index of Degree of Sedimentation | Clogging Preventing Ability |
| Comp Ex. No. | Abrasive | Clogging Preventive | Compound Group (A) | Compound Group (B) | Intermediate Alumina | pH | |
| I-1 | α-Alumina (16) | — | Glycolic acid (0.50) | Maleic acid (1.89) | θ-Alumina (4) | 7.0 | 72 | 0.60 |
| I-2 | α-Alumina (16) | — | Malic acid (0.10) Glycolic acid (0.50) | Maleic acid (1.89) | θ-Alumina (4) | 7.0 | 75 | 0.65 |
| I-3 | α-Alumina (16) | Ammonium molybdate (0.10) | Glycolic acid (0.50) | Maleic acid (1.89) | θ-Alumina (4) | 3.0 | 60 | 0.58 |
| I-4 | α-Alumina (20) | — | Glycolic acid (0.50) | Maleic acid (1.89) | — | 7.0 | 68 | 0.60 |
| I-5 | α-Alumina (20) | — | Glycolic acid (0.50) | — | — | 7.0 | 70 | 0.60 |
| I-6 | α-Alumina (20) | — | — | Maleic acid (1.89) | — | 7.0 | 59 | 0.56 |
| I-7 | α-Alumina (20) | — | Malic acid (1.89) | — | — | 7.0 | 79 | 0.77 |
| I-8 | α-Alumina (40) | Ammonium molybdate (10.0) | Malic acid (10.0) | — | — | 3.0 | 60 | 0.50 |
| I-9 | α-Alumina (20) | — | — | — | — | 7.0 | 39 | 0.30 |
| I-10 | α-Alumina (40) | Ammonium molybdate (10.0) | Citric acid (10.0) | — | — | 2.0 | 72 | 0.68 |

*Balance being ion-exchanged water.

listed in Table 3, and balance ion-exchanged water, with stirring. Here, the pH of each composition was adjusted to that shown in Table 3 with an aqueous ammonia or with nitric acid, and water was added thereto to give 100 parts by weight of each polishing composition.

Using each of the resulting polishing compositions, a substrate surface made of an Ni—P plated aluminum alloy, the substrate surface having Ra (an average deviation, of all points from plane fit to test part surface) of 0.2 μm, as determined by Talystep commercially available from Rank Taylor-Hobson Limited (size of tip end of profilometer: 25 μm×25 μm, by-pass filter: 80 μm, measurement length: 0.64 mm), a thickness of 0.8 mm and a diameter of 3.5 in was polished with a double-sided processing machine under Set Conditions II for Double-Sided Processing Machine given below, to give a polished Ni—P plated, aluminum alloy substrate usable for magnetic recording media.

Set Conditions If for Double-Sided Processing Machine are as follows.

Set Conditions II for Double-Sided Processing Machine
Double-sided processing machine: double-sided processing machine, Model 9B, manufactured by SPEEDFAM CO., LTD.
Processing pressure: 9.8 kPa
Polishing Pad: "Bellatrix N0058" (manufactured by Kanebo, LTD.).
Disc rotational speed: 50 r/min
Feeding flow rate for a polishing composition: 100 ml/min
Polishing time period: 5 minutes
Number of substrate introduced: 10

After polishing, the thickness of the aluminum alloy substrate of Examples was determined by using a thickness tester (a laser thickness tester, commercially available from Mitsutoyo Corporation, Model LGH-110/LHC-11N). A rate of decrease in the thickness was obtained from the changes in the thickness of the aluminum alloy substrate before and after polishing, and expressed as a relative value (relative polishing rate) on the basis of the polishing rate of Comparative Example II-1.

In addition, a clogging preventing ability is evaluated by polishing the aluminum alloy substrate continuously for twenty times without carrying out dressing under the above-mentioned polishing conditions and estimating the clogging preventing effect by using the ratio of the polishing rate of 20th polishing to the ratio of the first polishing rate as a measure for the clogging preventing ability. Here, the larger the ratio of the polishing rate of 20th polishing to the ratio of the first polishing rate, the higher the clogging preventing effect.

In addition, the surface defects (pits) on each polished substrate after 20th polishing under the above polishing conditions were evaluated in accordance with the following methods.

[Determinations of Pits]

The surface of each substrate was observed with an optical microscope (differential interference microscope) at a magnification of 200 times at an interval of 30° for 12 locations, and the number of pits in the 12 locations was counted and evaluated as follows:

[Evaluation of Pits]

⊚: the number of pits being less than 2;

○: the number of pits being 2 or 3;

Δ: the number of pits being 4 to 9; and x: the number of pits being 10 or more

The results for the polishing rate, the clogging preventing ability and the surface defects mentioned above are shown in Table 4.

TABLE 3

| | Clogging Preventive | | Other Components | | |
|---|---|---|---|---|---|
| | Compound | Amount (% by weight) | Compound | Amount (% by weight) | pH |
| Ex. No. | | | | | |
| II-1 | Citric acid | 0.1 | Itaconic acid | 0.5 | 2.5 |
| | | | θ-Alumina[1] | 1.0 | |
| II-2 | Citric acid | 1.5 | Itaconic acid | 0.5 | 2.5 |
| | | | θ-Alumina[1] | 1.0 | |
| II-3 | Citric acid | 0.1 | — | — | 3 |
| II-4 | Citric acid | 0.1 | — | — | 4 |
| II-5 | Citric acid | 0.1 | — | — | 7 |
| II-6 | Citric acid | 0.3 | — | — | 2.5 |
| II-7 | Citric acid | 0.05 | — | — | 3 |
| II-8 | Glycine | 0.1 | Itaconic acid | 0.5 | 2.5 |
| | | | θ-Alumina[1] | 1.0 | |
| II-9 | Ascorbic acid | 0.1 | Itaconic acid | 0.5 | 2.5 |
| | | | θ-Alumina[1] | 1.0 | |
| Comp. Ex. No. | | | | | |
| II-1 | Not added | — | Not added | — | 7 |
| II-2 | Not added | — | Succinic acid | 0.5 | 2.5 |
| II-3 | Not added | — | Itaconic acid | 0.5 | 2.5 |
| | | | θ-Alumina[1] | 1.0 | |
| II-4 | Citric acid | 2.5 | Itaconic acid | 0.5 | 2.5 |
| | | | θ-Alumina[1] | 1.0 | |
| II-5 | Ammonium molybdate | 2.0 | — | — | 2.5 |
| | Citric acid | 2.0 | | | |
| | Alumina sol[2] | 1.0 | | | |

TABLE 3-continued

|  | Clogging Preventive | | Other Components | | |
|---|---|---|---|---|---|
|  | Compound | Amount (% by weight) | Compound | Amount (% by weight) | pH |
| II-6 | Ammonium molybdate | 2.0 | — | — | 2.5 |
|  | Glycolic acid | 2.0 | | | |
|  | Alumina sol[2] | 1.0 | | | |

[1] θ-Alumina: average particle size: 0.23 μm, specific surface area: 80 m$^2$/g
[2] Alumina sol: commercially available from Nissan Chemical Industries, Ltd. under the trade name of Alumina Sol-200

TABLE 4

| Ex. No. | Clogging Preventing Ability | Polishing Rate (Relative Value) | Surface Defects (Pits) |
|---|---|---|---|
| II-1 | 0.95 | 2.4 | ⊚ |
| II-2 | 0.96 | 2.3 | ○ |
| II-3 | 0.94 | 1.5 | ⊚ |
| II-4 | 0.93 | 1.3 | ⊚ |
| II-5 | 0.92 | 1.3 | ⊚ |
| II-6 | 0.96 | 1.8 | ⊚ |
| II-7 | 0.89 | 1.2 | ⊚ |
| II-8 | 0.88 | 2.1 | ⊚ |
| II-9 | 0.89 | 2.0 | ⊚ |
| Comp. No. Ex. | | | |
| II-1 | 0.53 | 1.0 | X |
| II-2 | 0.62 | 2.4 | Δ |
| II-3 | 0.60 | 2.1 | Δ |
| II-4 | 0.93 | 2.1 | X |
| II-5 | 0.92 | 1.8 | X |
| II-6 | 0.75 | 1.8 | X |

It can be seen from the results of Table 4 that the polishing compositions obtained in each of Examples II-1 to II-9 all show remarkable improvements in the clogging preventing ability, higher polishing rates, and less generation of surface defects such as pits, as compared to those compositions obtained in Comparative Examples II-1 to II-6.

Figure 2:
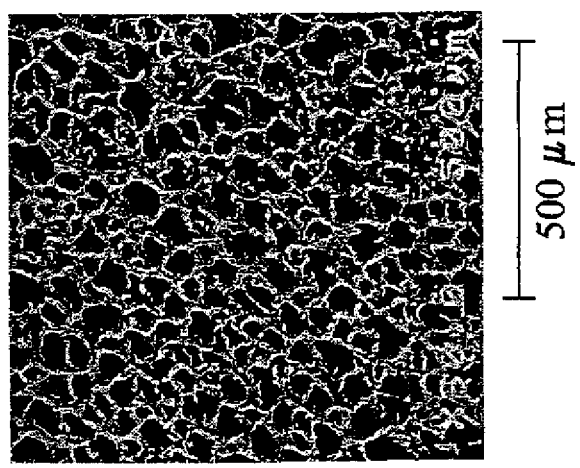
FIG. 2 is a view showing surface of a polishing pad after 20th polishing obtained in Example 1.
Figure 3:
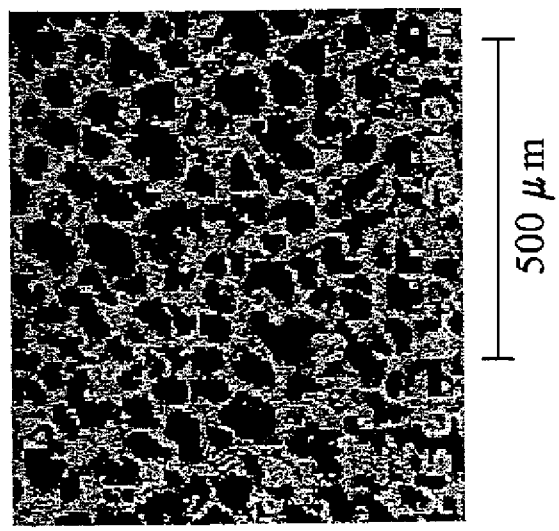
FIG. 3 is a view showing surface of a polishing pad after 20th polishing obtained in Comparative Example 3.

In addition, as compared to the surface of the polishing pad before polishing (shown in FIG. 1), only little polishing debris were adhered to the pores of the polishing pad on the surface of the polishing pad after 20th polishing obtained in Example II-1 (shown in FIG. 2). On the other hand, polishing debris were adhered to a majority of the pores of the polishing pad on the surface of the polishing pad after 20th polishing obtained in Comparative Example II-3 (shown in FIG. 3). Therefore, when the polishing composition obtained in Example II-1 was used, the frequency of dressing of the polishing pad could be remarkably reduced as compared to that of Comparative Example II-3. The surfaces of the polishing pads shown in each of FIGS. 1 to 3 were observed using an electron microscope commercially available from Hitachi, Ltd. under the trade name of Field-Effect Scanning Electron Microscope (FE-SEM), Model S-4000 with a magnification of 60 times.

Examples II-1 to III-16 and Comparative Examples III-1 to III-7

Formulation Method 1

There were mixed together 7 parts by weight of an abrasive [α-alumina (purity: about 99.9%) having primary average particle size: 0.23 μm, and secondary average particle size: 0.53 μm], a given amount of a compound formulated for preventing clogging as listed in Table 5, and balance ion-exchanged water, with stirring. Here, the pH of each composition was adjusted to that shown in Table 5 with an aqueous ammonia or with nitric acid, and ion-exchanged water was added thereto to give 100 parts by weight of each composition.

Formulation Method 2

There were mixed together 7 parts by weight of an abrasive [α-alumina (purity: about 99.9%) having primary average particle size: 0.23 μm, and secondary average particle size: 0.53 μm], 1 part by weight of an intermediate alumina (θ-alumina, average particle size: 0.2 μm, specific surface area; 150 m$^2$/g, purity: about 99.9%) serving both as a surface roughness-reducing agent and a polishing rate-increasing agent, 0.7 parts by weight of fumaric acid as a polishing rate-increasing agent, 0.3 parts by weight of glycolic acid as a roll-off reducing agent, a given amount of a compound formulated for preventing clogging as listed in Table 6, and balance ion-exchanged water, with stirring. Here, the pH of each composition was adjusted to that shown in Table 6 with an aqueous ammonia or with nitric acid, and ion-exchanged water was added thereto to give 100 parts by weight of each composition.

Formulation Method 3

There were mixed together 7 parts by weight of an abrasive [α-alumina (purity: about 99.9%) having primary average particle size: 0.23 μm, and secondary average particle size: 0.53 μm], 1 part by weight of an intermediate alumina (θ-alumina, average particle size: 0.2 μm, specific surface area; 150 m$^2$/g, purity: about 99.9%) serving both as a surface roughness-reducing agent and a polishing rate-increasing agent, 1 part by weight of itaconic acid as a polishing rate-increasing agent, 0.2 parts by weight of citric acid as a roll-off reducing agent, a given amount of a compound formulated for preventing clogging of the polishing pad as listed in Table 6, and balance ion-exchanged water, with stirring. Here, the pH of each composition was adjusted to that shown in Table 6 with an aqueous ammonia or with nitric acid, and ion-exchanged water was added thereto to give 100 parts by weight of each composition.

Using each of the compositions obtained by Formulation Methods 1 to 3, a substrate surface made of an Ni—P plated aluminum alloy, the substrate surface having an average deviation, of all points from plane fit to test part surface Ra of 0.2 μm, as determined with Talystep commercially available from Rank Taylor-Hobson Limited (size of tip end of profilometer: 25 μm×25 μm; by-pass filter: 80 μm; measurement length: 0.64 mm), a thickness of 0.8 mm and a diameter of 3.5 in (8.89 cm) was polished with a double-sided processing machine under the following Set Conditions III for Double-Sided Processing Machine, to give a polished Ni—P plated, aluminum alloy substrate usable for magnetic recording media.

Set Conditions III for Double-Sided Processing Machine are as follows.

Set Conditions III for Double-Sided Processing Machine
Double-sided processing machine: double-sided processing machine, Model 9B, manufactured by SPEEDFAM CO., LTD.
Processing pressure: 9.8 kPa
Polishing Pad: "DPM2000" (manufactured by Rodel Nitta K.K.).
Disc rotational speed: 50 r/min
Feeding flow rate for a polishing composition: 100 ml/min
Polishing time period: 5 minutes
Number of substrate introduced: 10

[Polishing Rate]

The thickness of the aluminum alloy substrate used above was determined by using a thickness tester (a laser thickness tester, commercially available from Mitsutoyo Corporation, Model LGH-110/LHC-11N). A rate of decrease in the thickness was obtained from the changes in the thickness of the aluminum alloy substrate before and after polishing, and expressed as a relative value (relative polishing rate) of the 1st polishing rate of each Examples III-1 to III-16 and Comparative Examples III-2 to III-7 on the basis of the 1st polishing rate of Comparative Example III-1.

[Clogging Preventing Ability]

The aluminum alloy substrate was polished continuously for twenty times without carrying out dressing under the above-mentioned polishing conditions, and the clogging preventing effect is estimated by using the ratio of the polishing rate of 20th polishing to the first polishing rate as a measure for the clogging preventing ability. Here, the larger the ratio of the polishing rate of 20th polishing to the first polishing rate, the higher the clogging preventing effect.

[Surface Roughness]

The average deviation, of all points from plane fit to test part surface Ra as determined using Talystep commercially available from Rank Taylor-Hobson Limited having the following features:

Size of tip end of profilometer: 25 μm×25 μm
By-pass filter: 80 μm
Measurement length: 0.64 mm was defined as surface roughness.

The relative value of the first surface roughness of each of Examples III-1 to III-16 and Comparative Examples III-1 to III-5 and III-7 on the basis of the first surface roughness of Comparative Example III-6 was obtained.

[Roll Off]

Figure 4:
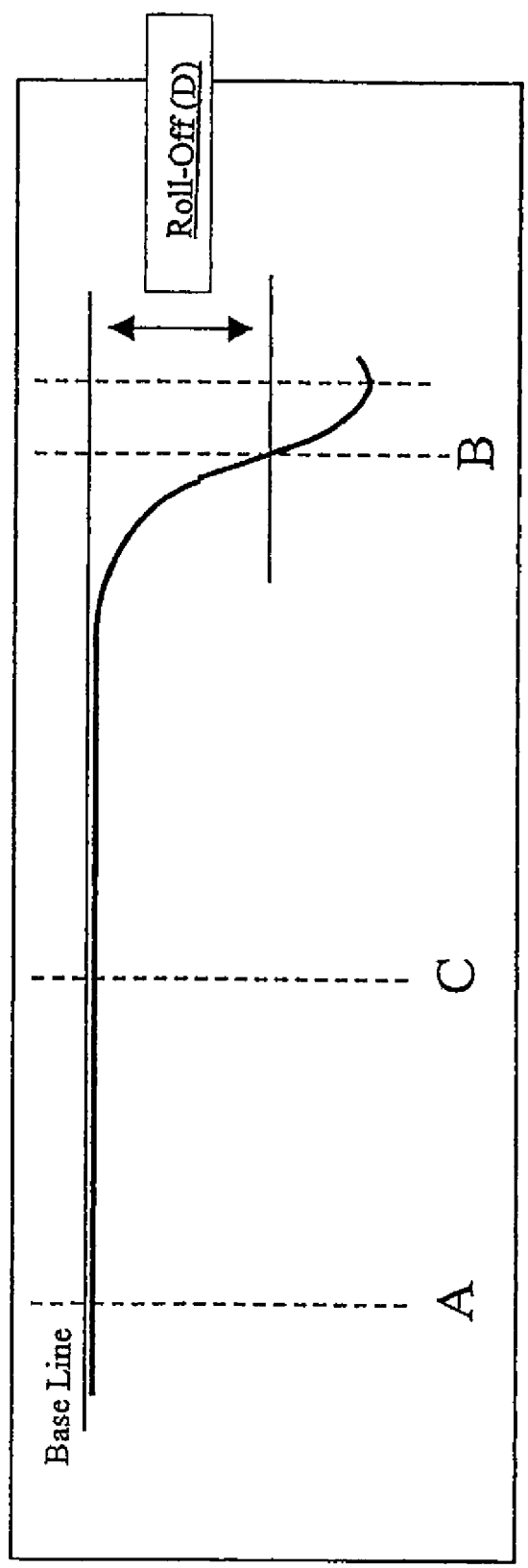
FIG. 4 is a graph showing a roll-off in connection with the detection curve.

The roll off was determined using a device commercially available from Mitsutoyo Corporation under the trade name of "Form Tracer SV-C624" under the following conditions:

Tip end radius of profilometer: 2 μm (Code No. 178-381)
Pressure at profilometer: 0.7 mN or less
Speed: 0.2 mm/s
Analyzing software: SV-600 Fine Profile Analysis System, Version 1.01
Filter: LPF (Gaussian) 0.800 mm Using the device as specified above, the shape of the end part of the disc at 42.5 mm to 47.5 mm away from the center of the disc was determined, and D was obtained by taking points A, B and C at 43 mm away from the center of the disc, at 47 mm away from the center, and at 45 mm away from the center, respectively, as shown in FIG. 4, by using an analyzing software in accordance with the above determination method. The value obtained by dividing D by ½ the amount of change of thickness of the disc before and after polishing is defined as the roll-off value.

The relative value for first roll off (relative roll off) for each of Examples and Comparative Examples was determined on the basis of the first roll off of Comparative Example III-6.

The polishing results when using the polishing compositions obtained by the above-mentioned formulation method 1 (Examples III-1 to III-10 and Comparative Examples III-1 to III-3) are shown in Table 5. Also, the compositions and the polishing results when using the polishing compositions obtained by the above-mentioned formulation methods 2 and 3 (Examples III-11 to III-16 and Comparative Examples III-4 to III-7) are shown in Table 6.

TABLE 5

| Ex. No. | Compound Formulated for Preventing Clogging | Amount (parts by weight) | pH | Clogging Preventing Ability | Polishing Rate (Relative Value) |
|---|---|---|---|---|---|
| III-1 | Sodium salt of copolymer of diisobutylene and maleic acid[1] | 0.005 | 7 | 0.90 | 1.1 |
| III-2 | Sodium salt of copolymer of diisobutylene and maleic acid[1] | 0.2 | 9 | 0.92 | 1.2 |
| III-3 | Sodium salt of copolymer of diisobutylene and maleic acid[1] | 0.01 | 5 | 0.88 | 1.1 |
| III-4 | Formalin condensate of sodium naphthalenesulfonate[2] | 0.2 | 3 | 0.75 | 1.0 |

TABLE 5-continued

| | Compound Formulated for Preventing Clogging | Amount (parts by weight) | pH | Clogging Preventing Ability | Polishing Rate (Relative Value) |
|---|---|---|---|---|---|
| III-6 | Sodium salt of copolymer of vinyl acetate and maleic acid[3] | 0.01 | 6 | 0.80 | 1.1 |
| III-7 | Aron UC-3120 | 0.1 | 7 | 0.85 | 1.0 |
| III-8 | Aron A-6016 | 0.05 | 7 | 0.89 | 1.1 |
| III-9 | Sodium alginate | 0.05 | 7 | 0.85 | 1.2 |
| III-10 | Catinal LC-200 | 0.01 | 7 | 0.77 | 1.0 |
| Comp. Ex. No. | | | | | |
| III-1 | Not Added | — | 7 | 0.53 | 1.0 |
| III-2 | Sodium alkylbenzene-sulfonate | 0.1 | 6 | 0.58 | 0.9 |
| III-3 | Sodium laurate | 0.05 | 9 | 0.58 | 0.8 |

Notes)
Aron UC-3120: commercially available from TOAGOSEI CO., LTD., polyacrylic acid-type polymer surfactant
Aron A6016: commercially available from TOAGOSEI CO., LTD., sulfonic acid-modified polyacrylic acid-type polymer surfactant
Catinal LC-200: commercially available from Toho Kagaku K.K., cationized cellulose-type polymer surfactant
[1] Diisobutylene/maleic acid = 1/1 molar ratio (weight average molecular weight: 10000)
[2] Weight-average molecular weight: 5000
[3] Vinyl acetate/maleic acid = 1/1 molar ratio (weight-average molecular weight: 8000)

It can be seen from the results of Table 5 that the polishing compositions obtained in Examples III-1 to III-10 all show remarkable improvements in the clogging preventing ability, as compared to those compositions obtained in Comparative Examples III-1 to III-3.

the roll off as those of Comparative Examples III-4 and III-6 in which the clogging preventive was not added.

The polishing composition of the present invention has an excellent clogging preventing effect. Therefore, when the polishing composition is used for polishing a substrate for

TABLE 6

| | Formulation Method | Compound to be formulated for preventing clogging | Amount (parts by weight) | pH | Clogging Preventing Ability | Polishing Rate (Relative Value) | Surface Roughness (Relative Value) | Roll Off (Relative Value) |
|---|---|---|---|---|---|---|---|---|
| Ex. No. | | | | | | | | |
| III-11 | 2 | Sodium salt of copolymer of diisobutylene and maleic acid[1] | 0.005 | 7 | 0.91 | 1.5 | 0.68 | 1.0 |
| III-12 | 2 | Formalin condensate of sodium naphthalenesulfonate[2] | 0.1 | 7 | 0.85 | 1.5 | 0.75 | 1.1 |
| III-13 | 2 | Sodium salt of copolymer of vinyl acetate and maleic acid[3] | 0.05 | 7 | 0.88 | 1.4 | 0.71 | 1.1 |
| III-14 | 3 | Sodium salt of copolymer of diisobutylene and maleic acid[1] | 0.01 | 6 | 0.93 | 1.5 | 0.71 | 1.1 |
| III-15 | 3 | Aron UC-3120 | 0.05 | 6 | 0.78 | 1.4 | 0.69 | 1.2 |
| III-16 | 3 | Sodium alginate | 0.01 | 6 | 0.82 | 1.4 | 0.67 | 1.1 |
| Comp. Ex. No. | | | | | | | | |
| III-1 | 1 | Not added | — | 7 | 0.53 | 1.0 | 1 | Undeterminable |
| III-4 | 2 | Not added | — | 7 | 0.48 | 1.5 | 0.70 | 1 |
| III-5 | 2 | Sodium alkylbenzenesulfonate | 0.01 | 7 | 0.52 | 1.3 | — | — |
| III-6 | 3 | Not added | — | 6 | 0.50 | 1.4 | 0.67 | 1.1 |
| III-7 | 3 | Sodium laurate | 0.05 | 6 | 0.55 | 1.3 | — | — |

It can be seen from the results of Table 6 that the polishing compositions obtained in Examples III-11 to III-16 all show remarkable improvements in the clogging preventing ability, as compared to those compositions obtained in Comparative Examples III-1, III-4 to III-7. Also, the polishing compositions of Examples III-11 to III-16 containing a clogging preventive maintain the same level of the surface roughness and precision parts, particularly a substrate made of an Ni—P plated aluminum alloy, there can be exhibited such effects that the problems in lowered polishing rate during continuous polishing generated by clogging of the polishing pad, and in prevention of generation of surface defects such as pits are eliminated, that the frequency of dressing of the polishing pad is reduced, and that the workability of the polishing and the productivity of the substrate can be improved.

EQUIVALENTS

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing a magnetic disk substrate comprising the step of polishing a magnetic disk substrate to be polished with a polishing composition comprising
    an abrasive which comprises α-alumina particles,
    water and
    a hydrophilic polymer compound selected from the group consisting of a copolymer of diisobutylene and maleic acid and a sulfonic acid-modified polyacrylic acid,
    wherein the polishing composition has a pH of from 2 to 7 and an index of degree of sedimentation of 80 or more and 100 or less.

2. The process according to claim 1, wherein the content of the hydrophilic polymer compound is from 0.001 to 1.5% by weight of the polishing composition.

3. The process according to claim 1, wherein the polishing composition further comprises:
    compound group (A): one or more compounds selected from the group consisting of carboxylic acids having 2 to 20 carbon atoms and having either OH group or groups or SH group or groups, monocarboxylic acids having 1 to 20 carbon atoms, dicarboxylic acids having 2 to 3 carbon atoms, and salts thereof and/or
    compound group (B): one or more compounds selected from the group consisting of polycarboxylic acids having 4 or more carbon atoms and having neither OH group or groups nor SH group or groups, aminocarboxylic acids, amino acids, and salts thereof.

4. The process according to claim 3, wherein the total amount of the compound group (A) is from 0.01 to 5% by weight of the polishing composition, and the total content of the compound group (B) is from 0.01 to 10% by weight of the polishing composition.

5. The process according to claim 1, wherein the α-alumina particles have an average primary particle size of from 0.01 to 1 μm.

6. The process according to claim 1, wherein the α-alumina particles have an average secondary particle size of from 0.1 to 1.2 μm.

7. The process according to claim 1, wherein the content of the abrasive is from 1 to 40% by weight of the polishing composition.

8. The process according to claim 1, wherein the abrasive further comprises intermediate alumina particles.

9. The process according to claim 8, wherein the polishing composition contains an alumina sol and the total content of the intermediate alumina and the alumina sol in the polishing composition is from 1 to 100 parts by weight, based on 100 parts by weight of the abrasive excluding the intermediate alumina and the alumina sol.

* * * * *